May 26, 1931. N. N. VOLODIMIROV 1,807,139
FLEXIBLE PACKING
Filed Sept. 13, 1926   2 Sheets-Sheet 1
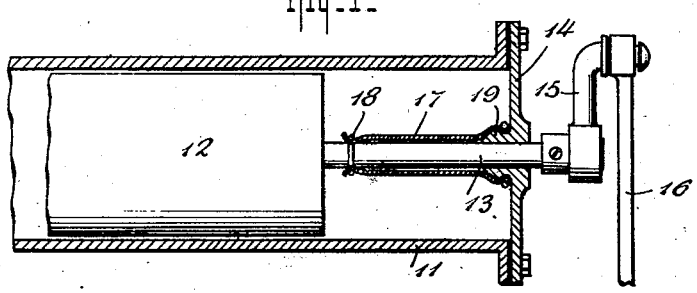
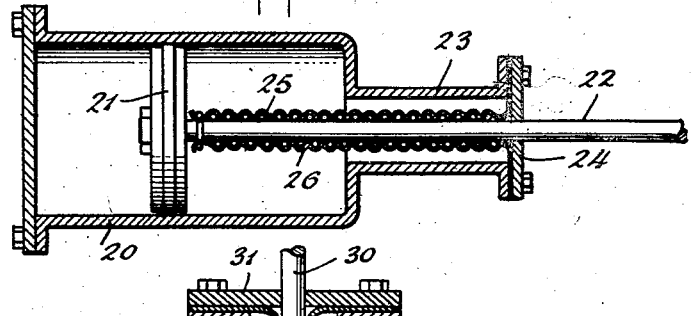
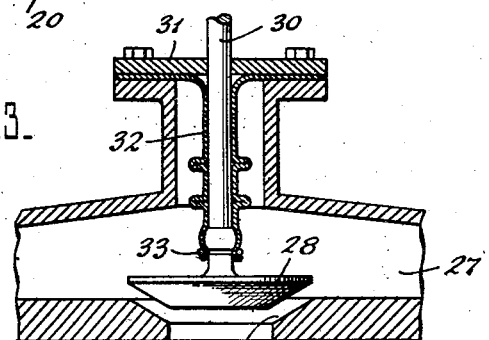
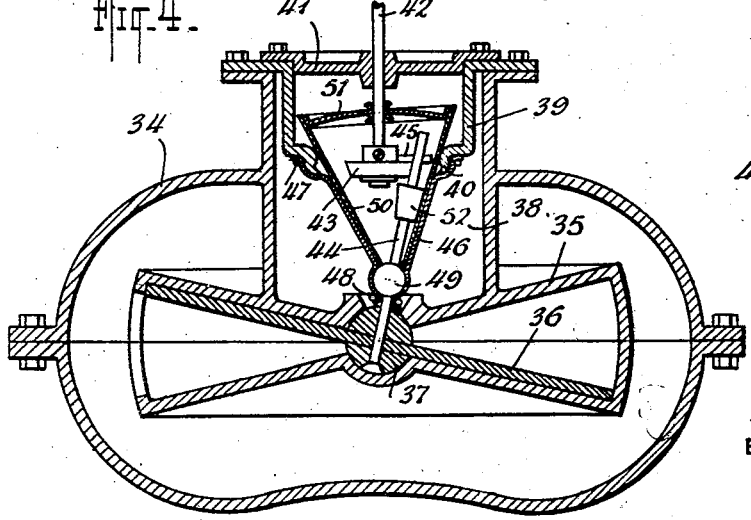
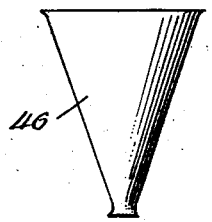
INVENTOR
NICHOLAS N. VOLODIMIROV
BY *Richards & Geier*
ATTORNEYS

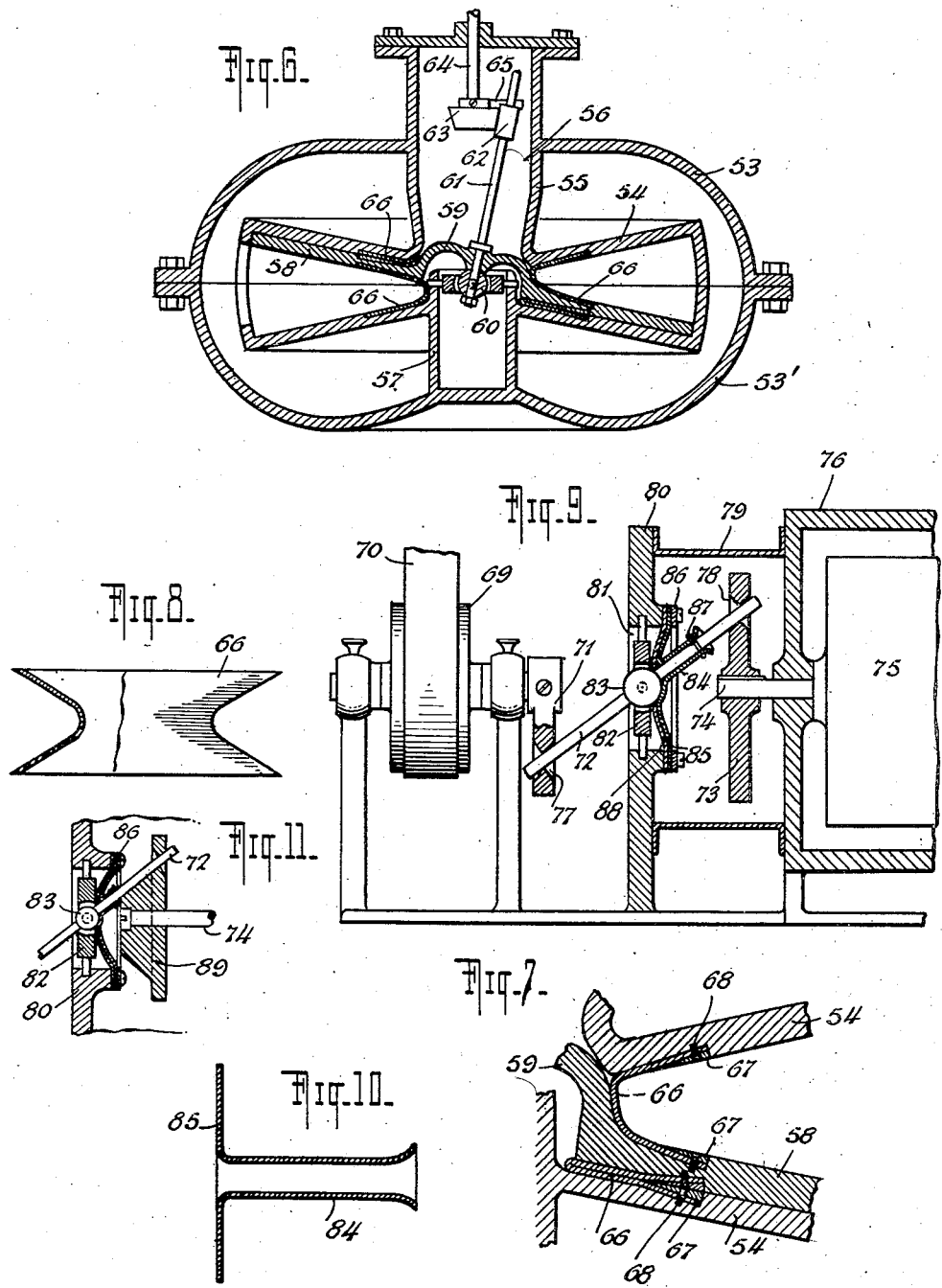

Patented May 26, 1931

1,807,139

UNITED STATES PATENT OFFICE

NICHOLAS N. VOLODIMIROV, OF RICHMOND HILL, NEW YORK

FLEXIBLE PACKING

Application filed September 13, 1926. Serial No. 135,011.

This invention relates to improvements in flexible packing, and particularly to flexible non-metallic tubular packing to be substituted for ordinary stuffing boxes. This tubular packing works almost without friction, does not require any grease, and can withstand a very high outside pressure.

An object of the invention is to provide an improved flexible non-metallic packing which will form an effective hermetic joint for various kinds of machinery working under pressure of liquid, air, gas or steam, in which all forms of rotary oscillating, continuous rotating and reciprocating motions are employed.

Other objects will appear more clearly in the course of the following description when taken in connection with the accompanying drawings which illustrate different applications of the invention.

In the drawings—

Figure 1 is a fragmentary longitudinal section through an apparatus wherein an oscillatory movement of parts is employed and illustrating one form of the invention in connection therewith;

Figure 2 is a fragmentary longitudinal section through another apparatus embodying a reciprocating movement and illustrating a different form of the invention in connection with the same;

Figure 3 is a fragmentary sectional view illustrating the invention in connection with a reciprocating valve apparatus;

Figure 4 is a similar view showing a different form of the invention in connection with a liquid meter of known type;

Figure 5 is an elevational view of the packing member employed in connection with Figure 4;

Figure 6 is a view similar to Figure 4 illustrating a similar type of meter and another form of the invention in connection therewith;

Figure 7 is an enlarged fragmentary sectional view of the apparatus shown in Figure 6 illustrating a means for attaching the packing members in position;

Figure 8 is a side elevation, partly in section, of a form of packing such as used in Figure 6;

Figure 9 is a fragmentary longitudinal section of a still further form of apparatus in which another embodiment of the invention is used for continuous rotating motion;

Figure 10 is a longitudinal section of the packing employed in Figure 9; and

Figure 11 is a sectional view showing a somewhat similar construction to that illustrated in Figure 9.

The apparatus shown in Figure 1 consists of a cylinder 11 adapted to contain gas, steam or liquid under pressure and having an oscillatory member 12 therein provided with a shaft 13 which extends through the cover 14 of the cylinder. The outer end of the shaft 13 is connected by a crank 15 to a connecting rod 16 which is adapted to oscillate the shaft. In order to prevent leakage of the gas, steam or liquid along the shaft 13 and through its bearing in the cover 14 of the cylinder, a flexible non-metallic tubular packing 17 is provided, one end of which is tied or hermetically connected at 18 to the shaft 13 and at its other end similarly secured to a boss or projection 19 formed upon the inner face of the cover 14 thus surrounding the portion of the shaft having its bearing in said cover. Due to the flexible nature of the packing 17 the same is capable of a torsional twist when the shaft 13 is oscillated by the operation of the member 16.

The application of the invention to apparatus embodying a reciprocating motion is illustrated in Figures 2 and 3. In Figure 2 the apparatus is shown as consisting of a cylinder 20 in which is mounted for reciprocation the piston 21 having a rod 22 which extends through a neck 23 of the cylinder and also through the cover 24 secured to said neck. The flexible packing 25 employed in this embodiment of the invention and utilized to make the cylinder 21 liquidtight, is also in the form of a tube having its outer end secured between the flange of the neck 23 and the cover 24 and its inner end fastened to the rod 22 adjacent the piston 21. The packing surrounds the piston rod and a spring 26 is coiled about said rod and interposed between the same and the packing. This spring assists in producing uniform folds in the packing when the latter is collapsed by the outward movement of the piston 21 and also aids in straightening out said folds when said piston moves in the opposite direction. Furthermore, the spring reduces frictional wear of the packing by preventing the friction of inner surface of packing upon the rod and thereby prolongs the life of the packing. A construction of this character also avoids the necessity of using a lubricant for the packing.

In Figure 3 there is illustrated an embodiment of the invention used with a poppet valve. Chamber 27 contains liquid, steam or gas under pressure and valve 28 is mounted for opening and closing the valve seat 29. The valve stem 30 extends through a cover 31 and in order to avoid leakage through said cover the flexible tubular packing 32 is employed. One end of this packing is clamped between the cover and the flange of the cylinder, while the other end thereof is tied or otherwise secured at 33 to the stem 30 adjacent the valve 28. Due to the flexible nature of the packing the same is adapted to collapse in the direction of its length, as shown in Figure 3, when the valve 28 is reciprocated and due to the fact that the packing tube is clamped tight at both ends it forms an effective closure to prevent leakage of the liquid, steam or gas through the cover 31.

In Figure 4 there is illustrated more or less conventionally a liquid meter including a housing 34 provided therein with a disc chamber 35 consisting of two substantially cone-shaped and oppositely disposed parts in which a disc 36 is adapted to rotate and also oscillate about the ball 37 under the influence of the liquid flowing through the disc chamber 35. Above the chamber 35 and forming a part of the housing there is provided a chamber 38 and at the upper end inside thereof is a substantially tubular member 39 having its outer end secured to the housing and its inner end reduced, as indicated at 40. The outer end of the member 39 is closed by a cover 41 in which the shaft 42 of a registering mechanism, employed in connection with a meter of this type, has a bearing. The inner end of the shaft 42 carries a guide roller 43 which bears against the upper end of a pin or rod 44, the lower end of which is secured to the ball 37. As this ball rotates and oscillates in accordance with the movements of the disc 36 the upper end of the rod 44 describes an arc and engages a finger 45 extending laterally from the roller 43 so that the shaft 42 will be rotated to operate the registering mechanism. It is desirable to protect the shaft 42 and all its associated parts against the influence and pressure of any liquid, such as water, which could escape from the disc chamber 35 into the chamber 38 and to prevent the escape of such liquid from chamber 38 to member 39 and to the register, to make the inside of the cone 50 and of the member 39 dry and under atmospheric pressure only and to avoid any packing on shaft 42. For this purpose a flexible packing element is employed which is of substantially inverted cone shape with the larger end secured to the reduced end 40 of the member 39, as indicated at 47, and its smaller end similarly secured at 48 about the enlargement 49 of the rod 44. Any liquid which may escape into the chamber 38 may build up a pressure therein and to avoid the possibility of any excess pressure collapsing the packing member 46 the same is braced by a substantially inverted conical shaped, stiff, non-flexible member 50 projecting downwardly through the reduced inner end of the member 39 and supporting the wall of said packing, with the open lower end of said member 50 resting upon the enlargement 49 and an intermediate portion thereof having a bearing upon the reduced end 40 of said member 39. The upper end of the member 50 is provided with a cover 51 which is guided by the shaft 42 and the inner surface of said member 50 forms a bearing for a guide roller 52 carried by the rod 44, said roller 52 combining with the roller 43 to guide the rod in its circular movements.

In Figure 6 a somewhat similar construction of a disc meter is shown consisting of a housing 53 having a disc chamber 54 therein of substantially the same configuration as the disc chamber 35. The upper portion of the housing 53 is provided with a centrally disposed annular wall 55 forming a neck of the disc chamber and providing a chamber 56 above said chamber 54, while the lower half 53' of said housing is likewise formed with an inwardly extending wall 57 also joining the lower portion of the disc chamber 54. A disc 58 similar to the disc 36 is mounted within the casing 54 for rotary and oscillatory movements and is provided with the central curved portion 59 which projects into the lower portion of the chamber 56. The disc 58 is supported by a universal joint structure 60, one of the elements of which has a bearing in the upper end of the wall 57 of the housing. In the center of said joint is pivoted the lower end of a rod 61 projecting upwardly through the central portion 59 of the disc 58 and the upper end of said rod carries a roller 62 which is rolling on a guide roller 63 carried by the lower end of the shaft 64 which is connected to a registering mechanism (not shown). Said rod 61 also engages a finger 65 secured to the shaft 64 so that as the disc 58 is rotated and oscillated the upper end of the rod will be caused to describe an arc and in engaging the finger 65 will rotate the shaft 64. In order to prevent leakage through the central part of the disc 58 into the chamber 56 and also the chamber formed by the wall 57 two flexible packing elements 66 are employed. Each of these elements, as shown in Figure 8, is of tube-like formation and constricted intermediate its ends so that the portions of the wall thereof on the opposite sides of the constriction may be collapsed one against the other by the movements of the disc 58 when the packing element is in position. One of the elements is mounted over the central portion 59 of the disc with one part of the wall of the element secured to the upper wall of the disc chamber, while the other part of the wall of said element is secured to the upper surface of the disc 58. Thus an effective seal is provided which will prevent the escape of liquid past the packing into the chamber 56. The other packing element is disposed below the disc 58 with one of the walls of said packing element secured to the underside of the disc 58 and the other wall of said element secured to the lower wall of the disc chamber 54, thereby preventing the leakage of liquid past said packing element and into the chamber formed by the wall 57 in which the universal joint 60 is located, so that chamber 56 and chamber inside the wall 57 are dry and relieved from the pressure of liquid.

As a means for securing the walls of the packing element 66 to the disc and the walls of the disc chamber, there are provided beveled retaining rings 67 (Figure 7), one of which is engageable with the edge of each wall of each packing element 66 with said edge interposed between the ring and the disc or the wall of the disc chamber to which said packing element is secured. Suitable fasteners 68 are extended through the retaining ring, packing element, and into the surface to which the latter is secured so as to adequately fasten the packing elements in position.

In the apparatus shown in Figure 9, wherein the continuous rotary motion of one element is utilized to transmit rotation to another element, a pulley 69 is driven from a suitable source of power by a belt 70 to impart rotation to the crank arm 71 secured to the shaft of said pulley. The rotary motion of this crank arm is transmitted by means of a rod 72 to a disc 73 keyed to the trunnion 74 of a drum or rotatable cylinder 75 mounted within the casing 76, one end of the rod 72 being loosely disposed within an opening 77 in the crank 71, while the other end of said rod is similarly disposed in an opening 78 in the disc 73. The latter disc and associated parts are enclosed within a housing 79 secured to one end of the casing 76 and to a support 80 having an opening 81 therein. One member 82 of a universal joint is mounted within the opening 81 and has pivotally connected thereto the central enlarged portion 83 of the rod 72 so as to permit the ends of said rod to describe an arc under the influence of the crank arm 71 and thus transmit the rotation thereof to the disc 73 and consequently the drum or cylinder 75. A ball socket can be used instead of universal joint 82, 83. To prevent any leakage of a liquid from the chamber formed by the housing 79 through the opening 81 the flexible non-metallic packing element 84 is employed. This element, as shown in Figure 10, is also of tube-like formation and provided at one end with a flange 85 of sufficient diameter to close the opening 81 and held in position on the support 80 by means of a clamping plate 86. The tubular portion of the packing element surrounds the part of the rod 72 extending into the chamber formed by the housing 79 and the extremity of said tubular portion is secured to the rod by any suitable fastening means 87. In this manner any leakage of liquid along the rod 72 and through the opening 81 is prevented. In order to avoid collapsing of the flange 85 of the packing, due to any pressure which might be generated within the chamber formed by the housing 79, there is provided a rigid non-flexible bracing element 88, in the form of a plate, disposed exteriorly of the flange 85 and also held in position on the support 80 by means of the clamping plate 86.

Figure 11 shows the same described mechanism, except that a tapered roller 89 is used instead of disc 73. The rod 72 rests in a groove in the roller 89 and revolves together with the roller and the shaft 74. The purpose of the roller 89 is to eliminate the eddy currents in the liquid.

What is claimed is:—

In an apparatus wherein fluid under pressure is utilized, the combination with a stationery element having a securing surface, and a movable rod extending angularly to said surface; of a flexible tube-like packing capable of expansion and contraction in accordance with the movements of said rod, said packing having one end secured directly to said rod and its other end extending angularly from the rod and attached to said surface, said packing snugly fitting said rod between its point of attachment to the latter and the point where the packing extends angularly from the rod.

In testimony whereof I have affixed my signature.

NICHOLAS N. VOLODIMIROV.